Dec. 22, 1925.

H. TRENCHAM ET AL
ELECTRIC SWITCH
Filed Oct. 22, 1923   2 Sheets-Sheet 1

1,566,935

Switch Tripping Device

Inventors:
Henry Trencham,
Herbert G. Heath.
by Alexander S. [Kent]
Their Attorney.

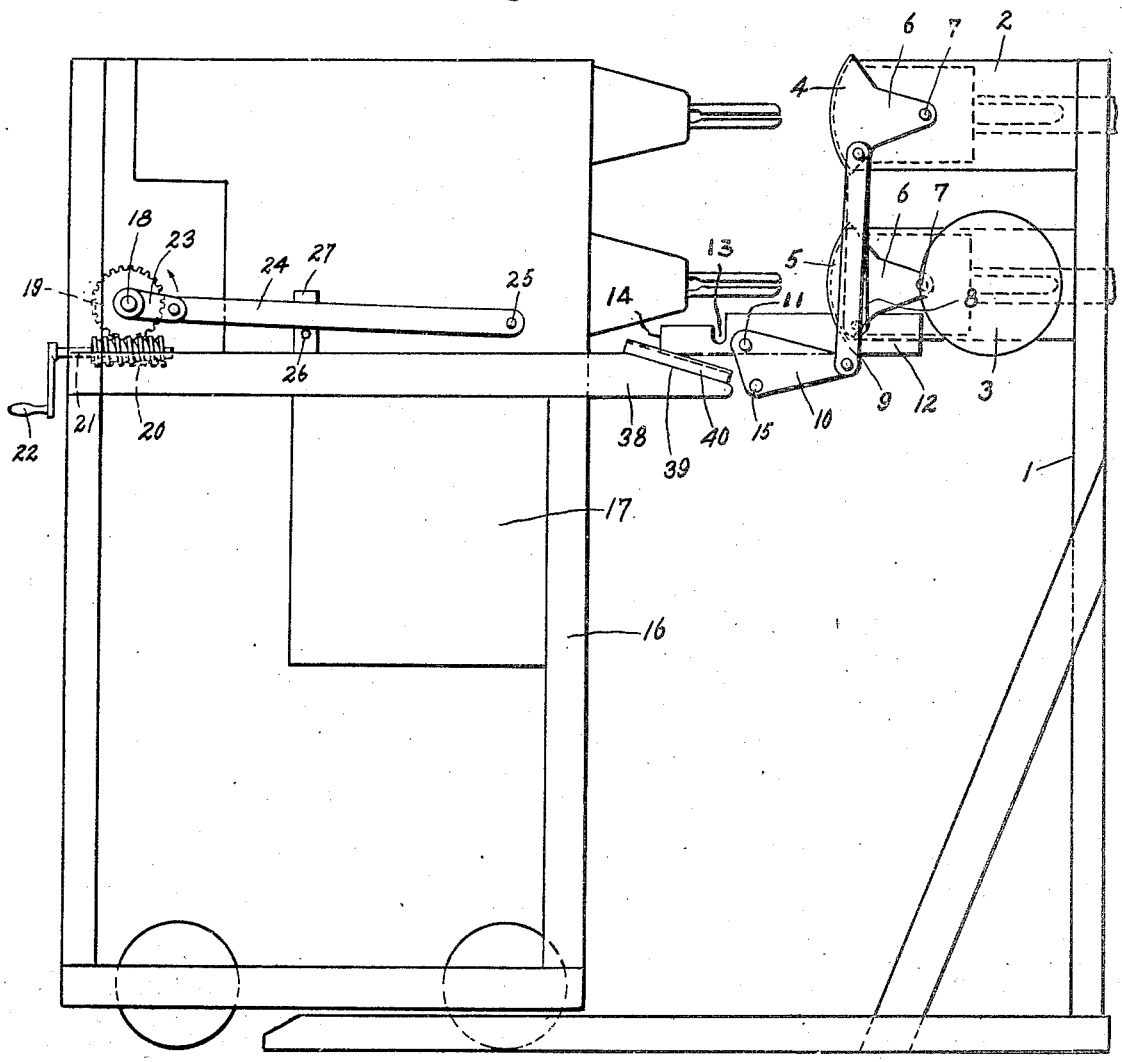

Patented Dec. 22, 1925.

1,566,935

UNITED STATES PATENT OFFICE.

HENRY TRENCHAM, OF RUISLIP, AND HERBERT CHRISTOPHER HEATH, OF WEMBLEY, ENGLAND, ASSIGNORS TO GENERAL ELECTRIC COMPANY, A CORPORATION OF NEW YORK.

ELECTRIC SWITCH.

Application filed October 22, 1923. Serial No. 670,146.

*To all whom it may concern:*

Be it known that we, HENRY TRENCHAM and HERBERT CHRISTOPHER HEATH, subjects of the King of Great Britain, residing at Ruislip, and Wembley, in the county of Middlesex, England, respectively, have invented certain new and useful Improvements in Electric Switches, of which the following is a specification.

Our invention relates to electric switches of the type in which the main switch, usually an oil break switch, is mounted on a truck so as to be rolled toward and from a stationary frame or panel to which the high tension leads are attached, the truck and frame having cooperating isolation contacts, whereby upon the withdrawal of the truck, the connections to the switch are broken and the truck becomes electrically isolated.

An object of our invention is to provide for positively covering the isolation contacts carried by the stationary frame whenever the truck is rolled out therefrom. Another object is to provide means for tripping the switch carried by the truck whenever the truck is moved from either one of two predetermined positions and for holding the switch trip mechanism actuated until the truck reaches the other position.

According to our invention we provide a shutter for each of the isolation contacts carried by the stationary frame, the shutters being pivoted to the frame so that when swung down they effectively cover the contacts and when swung up they uncover the contacts to permit engagement with the cooperating contacts carried by the truck. By suitable links and levers these shutters are positively moved to the covering position whenever the truck is withdrawn from the stationary frame and are positively moved to uncovering position whenever the truck is rolled toward the frame into circuit closing position therewith. For moving the truck into and out of circuit closing position we provide an irreversible gearing comprising a worm and worm wheel, the latter being connected to a cam wheel which operates the tripping mechanism of the switch carried by the truck in all positions except its two extreme positions. A link attached at one end to a crank serves to engage the stationary frame for moving the truck and also by engaging another portion of the frame serves to prevent possible movement of the truck to circuit closing position should the cam be in such a position that the switch is not held tripped.

Figure 1:
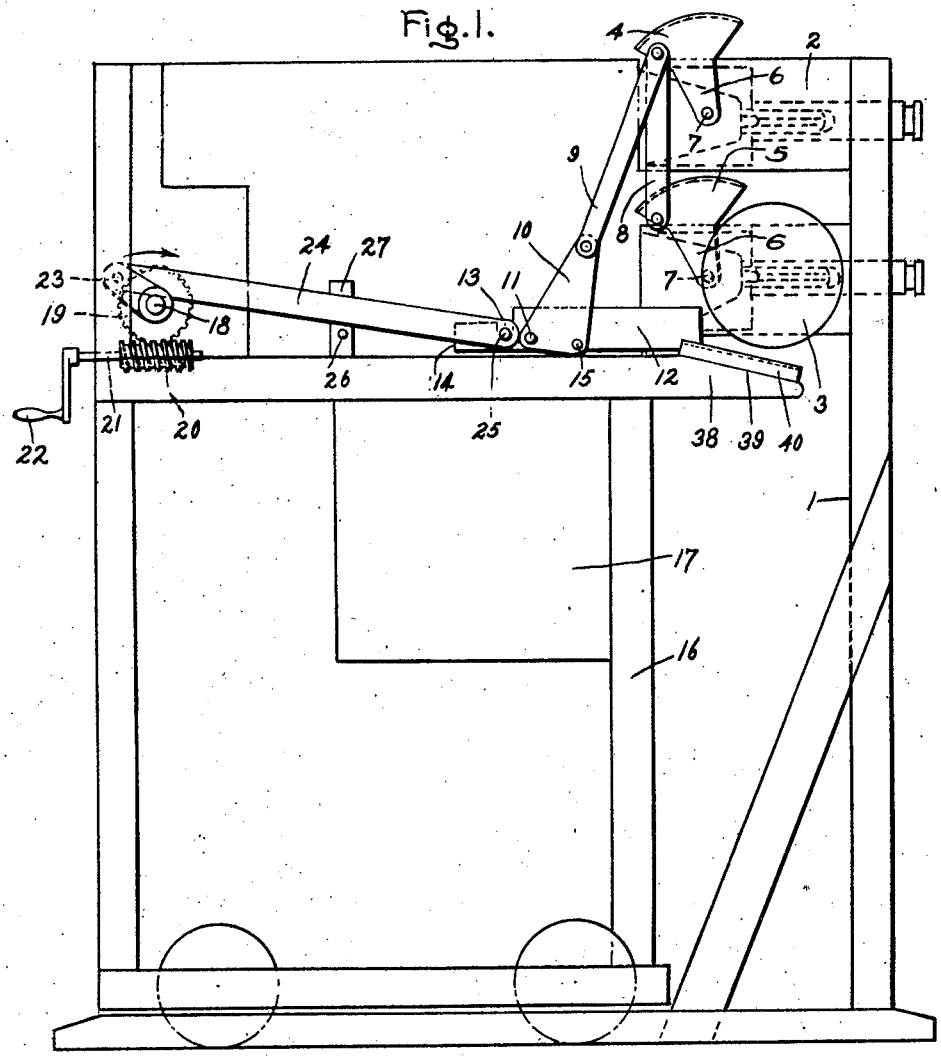
Figure 3:
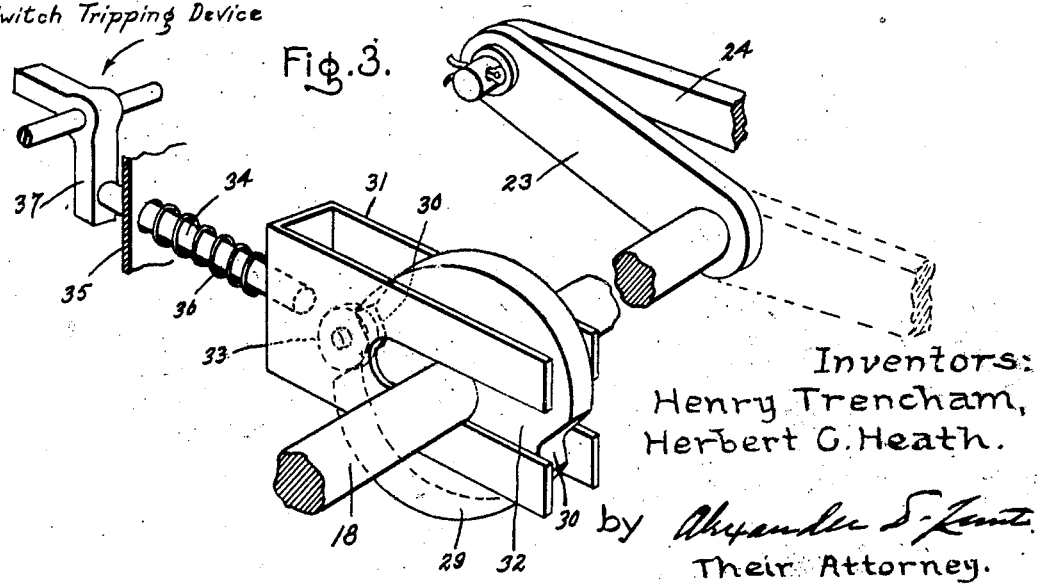

Our invention will be better understood by reference to the accompanying specification and drawing and its scope will be pointed out in the appended claims. Figure 1 shows a stationary frame and switch carrying truck involving my invention, the truck being rolled out from the frame; Fig. 2 is similar to Fig. 1 but with the truck in circuit closing position with the frame; and Fig. 3 is a perspective view of a portion of the operating and tripping mechanism.

Referring to the drawing, the stationary frame 1 shown in dot-and-dash lines has compartments 2 and 3 open at one end and within which are located the isolating stationary contacts, not shown. Arcuate shutters 4 and 5 cooperate respectively with the compartments 2 and 3 to cover or uncover the stationary contacts located therein. Each shutter has an arm 6 at each end by which the shutter is pivotally mounted at 7 on the corresponding compartment. The two shutters are connected together by a link 8 and the upper shutter is connected by a link 9 to a triangular plate 10 pivoted at 11 to an arm 12 forming a part of the stationary frame 1. The arm 12 has a slot 13 near its outer end and a square end face 14. The triangular plate 10 carries a stud 15 whose function will be described later.

The truck 16, shown in dot-and-dash lines, is adapted to be rolled toward or from the stationary frame 1. This truck may carry an oil switch in the space marked 17 and have contacts, not shown, adapted to project into the compartments 2 and 3 and engage the stationary contacts therein when the truck is rolled up against the stationary frame. For convenience the truck will be described as having three principal positions, namely, "full in", "out", and "full out". The "full in" position is that shown in Fig. 1 while the "full out" position is that shown in Fig. 2. The "out" position is intermediate those two positions and is the position furthest from the stationary frame to which the truck can be moved by means of the operating mechanism. A shaft 18 is journalled on the truck and has secured to it a worm wheel 19. Meshing therewith is a worm 20 on shaft 21 which is also journalled on the truck and adapted to be operated by means of a crank 22. A crank 23 secured to the shaft 18 is pivoted to a link 24 having a stud 25 at its opposite end. A stud 26 carried by a post 27 supports the link 24 at certain times to be described later. On the same shaft 18 is a cam wheel 29 having two notches 30. A shroud 31 slotted at 32 to receive the shaft 18 has a roller 33 which is adapted to roll against the cam face and drop into one or the other of the notches 30. The shroud 31 has a guide rod 34 which slides through an opening in the frame 35 and is surrounded by a spring 36 by which the roller is maintained in contact with the face of the cam. The free end of the rod 34 is adapted to engage the tripping device 37 forming a part of the main switch whenever the roller is forced out of a notch by the rotation of the cam. While the main switch and its operating mechanism are not shown, it is to be understood that they may be of any type in common use having a trip which may be actuated by the device 37. For the actuation of the shutters 4 and 5 on the stationary frame the truck is provided with a horizontal member 38 having a bevel face 39 upon which slides the stud 15 of the plate 10. A member 40 extending along the bevel face 39 forms therewith a guideway for retaining the stud 15.

The operation of the apparatus is as follows: If with the parts in the positions shown in Fig. 1, it is desired to withdraw the truck from the stationary frame the handle 22 is rotated in a direction to move the crank 23 in the direction of the arrow. The stud 25 on the end of link 24 being seated in the slot 13, the truck is thereby pushed away from the frame separating the isolation contacts carried by the frame and the truck. During this movement, the stud 15 slides along the member 38 and through the guideway formed by members 38 and 40 whereby the two shutters are positively moved from the open position shown in Fig. 1 to the closed position shown in Fig. 2.

The truck gearing described is used to move the truck to what has been termed the "out" position, at which position the crank 23 reaches the limiting position shown in Fig. 2. Furthermore, since the stud 25 is resting in the slot 13 the truck cannot be pushed back by any other means than by the gearing provided for that purpose, but the operation of that gearing insures the tripping open of the main switch before the separation of the contacts carried by the truck and frame. Just prior to coming to the "out" position, the link 24 has been rocked on the stud 26 thereby lifting the stud 25 from the bottom of the slot 13 sufficient to clear the end portion of the arm 12. The truck may now be rolled out by hand to the "full out" position illustrated by Fig. 2. In replacing the truck the reverse operations are followed, in which case the stud 15 rides up on the face 39 raising the shutters prior to the entering of the contacts carried by the truck into the compartments 2 and 3. By so arranging the notches 30 on the cam wheel that the roller 33 is in engagement with a notch when the crank is in either of the two positions illustrated, it will be seen that as soon as the crank is moved to any intermediate position the tripping device 37 is actuated to open the main switch controlled thereby, and the tripping device furthermore remains operated as long as the crank remains in any intermediate position. It will also be seen that the truck cannot be rolled into its "in" position without operating the gear provided for that purpose and incidentally tripping the main switch if it is not already open. Should one attempt to roll in the truck to its "in" position, with the crank positioned as shown in Fig. 2, the stud 25 on link 24 would strike the long side of slot 13 and prevent further movement of the truck. Likewise, should one attempt to roll in the truck with the crank positioned as in Fig. 1 or in any intermediate position the stud 25 would also strike the end face 14 of arm 12.

Although we have shown and described but a single set of links, levers, etc., for operating the truck and the shutters, it may be desirable under certain circumstances to use similar sets at opposite sides of the truck and frame.

While we have described only one embodiment of our invention, we do not wish to be limited to the particular form shown and described as it will be apparent that many modifications therein may be made without departing from the scope of our invention as set forth in the appended claims.

What we claim as new and desire to secure by Letters Patent of the United States, is:—

1. In an electric switch gear of the truck type, cooperating contacts carried by the stationary and truck portions thereof, a movable shutter adapted in one position to cover the contact carried by said stationary portion, and means actuated by the truck in its movement away from the stationary portion for moving the shutter to said contact covering position.

2. An electric switch gear comprising a stationary portion and a truck portion, cooperating isolation contacts carried by said portions, a shutter mounted on said stationary portion and adapted to swing into a position to cover the contact carried thereby, and means on said stationary portion and actuated by said truck for swinging said shutter into a position to cover said contact.

3. An electric switch gear comprising a stationary frame and a truck, cooperating isolation contacts carried by said frame and truck, a shutter pivotally mounted on said frame adapted when in one position to cover the contact carried by said frame and when in another position to uncover said contact, and cooperating mechanism carried by said frame and said truck for swinging said shutter whereby when said truck is withdrawn from the frame and the shutter is swung into contact covering position and when the truck is returned the shutter is swung to a position to uncover the contact.

4. An electric switch gear comprising a stationary frame, a truck, cooperating isolation contacts carried by said frame and truck, a trip-open switch carried by said truck, means for moving said truck toward and from said frame and means actuated by said first means for tripping open said switch.

5. An electric switch gear comprising a stationary frame, a truck, cooperating isolation contacts carried by said frame and truck, a trip-open switch carried by said truck, means for moving said truck away from said frame to separate said contacts and means responsive to movement of said first means for tripping said switch before separation of said isolation contacts.

6. An electric switch gear comprising a stationary frame, a truck having a switch mounted thereon and provided with a trip-open device, cooperating isolation contacts carried by said frame and truck, means for moving said truck toward said frame, and means operatively connected with said first means for actuating said trip-open device and for holding the same actuated until said truck has been moved to a position to connect said isolation contacts.

7. An electric switch gear comprising a stationary frame, a truck, cooperating isolation contacts carried by said frame and truck, operating gear for moving said truck, toward and from said frame, a switch carried by said truck adapted to be tripped open by said operating gear, and means for preventing movement of said truck to close or to open the circuit controlled by said isolation contacts except through the instrumentality of said operating gear.

8. An electric switch gear comprising a stationary frame, a truck movable toward and from said frame, mechanism comprising interconnecting members carried respectively by said truck and said frame for moving said truck a predetermined distance from said frame, and means for causing a disconnection of said members when said truck has been moved said distance thereby permitting further movement of said truck independently of the operating gear.

In witness whereof, we have hereunto set our hands this 11th day of October, 1923.

HENRY TRENCHAM.
HERBERT CHRISTOPHER HEATH.